United States Patent [19]
Hung et al.

[11] Patent Number: 5,710,573
[45] Date of Patent: Jan. 20, 1998

[54] SCALED VIDEO OUTPUT OVERLAID ONTO A COMPUTER GRAPHICS OUTPUT

[75] Inventors: Chi-Cheng Hung; Jack Chang; Rong-Fuh Shyu; Wen-I Chu, all of Hsinchu, Taiwan

[73] Assignee: Winbond Electronics Corp., Taiwan

[21] Appl. No.: 434,974

[22] Filed: May 4, 1995

[51] Int. Cl.$^6$ .................... G06F 15/66; H04N 5/262
[52] U.S. Cl. ..................... 345/127; 545/115; 348/584
[58] Field of Search ..................... 345/113, 115, 345/127, 129, 130; 348/584, 589, 600, 581; 382/298

[56] References Cited

U.S. PATENT DOCUMENTS

| | | | |
|---|---|---|---|
| 4,580,165 | 4/1986 | Patton et al. | 348/589 |
| 4,682,243 | 7/1987 | Hatayama | 382/298 |
| 4,821,031 | 4/1989 | Roberts | 345/127 |
| 4,825,388 | 4/1989 | Dailey et al. | 364/518 |
| 5,068,731 | 11/1991 | Takeuchi | 348/581 |
| 5,150,461 | 9/1992 | Reynolds | 395/164 |
| 5,398,075 | 3/1995 | Freytag et al. | 348/590 |
| 5,422,678 | 6/1995 | Takeuchi | 345/127 |
| 5,469,221 | 11/1995 | Takeuchi | 348/584 |
| 5,532,716 | 7/1996 | Sano | 345/127 |
| 5,541,666 | 7/1996 | Zeidler et al. | 348/584 |

FOREIGN PATENT DOCUMENTS

| | | |
|---|---|---|
| A-0 384 257 | 2/1990 | European Pat. Off. |
| A-0 484 981 | 11/1991 | European Pat. Off. |
| A-0 610 829 | 2/1994 | European Pat. Off. |
| A-2 245 394 | 1/1992 | United Kingdom |

*Primary Examiner*—Wendy Garber
*Attorney, Agent, or Firm*—Meltzer, Lippe, Goldstein et al.

[57] ABSTRACT

A display control apparatus is provided to generate a scaled video output overlaid onto a computer graphics output. The display control apparatus includes a timing generator, adapted to receive a horizontal synchronization signal of the computer graphics output and the pixel number of horizontal scan line of the scaled video output, for generating a pixel clock of scaled video output and a horizontal lock signal; a scaling buffer, storing a video digital pixel data and having an output port generating the scaled video output, responsive to the pixel clock of scaled video output; an overlay controller, coupled to a controller bus and receiving an analog pixel data of the computer graphics output and, responsive to the pixel clock of scaled video output, the horizontal lock signal and a vertical synchronization signal of the computer graphics output, for overlaying the scaled video output onto the computer graphics output.

26 Claims, 7 Drawing Sheets

SCALED VIDEO OUTPUT OVERLAID ONTO A COMPUTER GRAPHICS OUTPUT

TECHNICAL FIELD OF THE INVENTION

The invention relates to a display control apparatus and, in particular, to a display control apparatus generating scaled video output overlaid onto a computer graphics output.

BACKGROUND OF THE INVENTION

The video scaling, e.g. enlargement or reduction, has been applied in many data processing environments to result in an expected display on an output device.

In the conventional approach, a video reduction circuit is provided upstream to the video buffer storing the video pixel data in order to match the timing of the input operation with that of the output operation to the video buffer. The video reduction circuit either stores or neglects a pixel data in accordance with the scaling factor encountered. On the other hand, a video enlargement circuit is provided downstream to the video buffer and, in accordance with the scaling factor, the video enlargement circuit outputs same pixel data repeatedly. This conventional approach has a less flexibility in processing the image than expected. For instance, the convention approach would have difficulty operating a second scaling to the original pixel data, if it is possible. Furthermore, both enlargement and reduction circuit are required to perform the video scaling operation which is not economical in view of the circuit design. In the area of overlay of the video output onto the computer graphics output, two approaches are known to the applicants. The first approach uses a common frame buffer and the second approach uses a multiplexing technique to effectuate the overlay effect. It is well known the video output may come from video compact disk (CD), digital camera or digital TV output, etc., and the computer graphics output may come from the any graphics generator including well known VGA, etc.

In the first approach, one area of the display memory of the computer graphics output is allocated for storing video pixel data and a video interface stores the video pixel data into the area for video. When display controller outputs the data of the computer graphics output to the display device, the video pixel data are also output together with other computer graphics pixel data. Accordingly, in the system, a video interface is required. Consideration to be made regarding the video interface of the computer graphics, when designing the video system, is another important concern. The above requirements place restrictions both on the hardware architecture and system cost of the image display system of the type.

In the second approach, a digital interface is required to provide video digital pixel data to the system and then the system generates a key signal to produce the overlay effect. The digital interface is used to generate control signals synchronizing the output operation of the video pixel data with computer graphics output having different resolutions, or, different synchronization signals. In more details, a color key approach compares the pixel data of the computer graphics output with a predefined target color. The image output is switched to the video source through a multiplexer when the comparison shows a match. Otherwise, the image output is the computer graphics output. A window key approach, however, tests if the location of the pixel data falls within a predefined window. The video source is output when the test shows yes. Otherwise, the image output is the computer graphics source. However, with the color key approach, on the display area outside the displayed video, if any pixel data has color same as the target color, the computer graphics output at this location is replaced by the video pixel data, which is not expected. With the window key approach, the video window is always overlaid on the computer graphics output, such that when an indication label of computer graphics output, e.g. mouse arrow, moves into the video window, the indication label disappears. Furthermore, since a digital interface, which has a variety of standards nowadays, is required for the operation of the approaches mentioned above, the conventional approach faces many restrictions and inconvenience while overlay effect is to be performed.

SUMMARY OF THE INVENTION

It is therefore an objective of the invention to provide an apparatus which overlays a scaled video onto a computer graphics output.

It is also an objective of the invention to provide an apparatus of the type without a digital interface therein.

A timing generator is provided to receive a horizontal synchronization signal of the computer graphics output and generates a pixel clock of scaled video output and a horizontal lock signal.

A scaling buffer, storing a video digital pixel data and having an output port, is provided to generate a scaled video output, in response to the pixel clock of scaled video output and the scaling factor received.

An overlay controller, receiving an analog pixel data of the computer graphics output and responsive to the pixel clock of scaled video output, the horizontal lock signal and a vertical synchronization signal of the computer graphics output, is provided to overlay the scaled video output onto the computer graphics output.

Further merits of the invention will be more obvious with the following detailed description of the invention along with the appended drawings.

DETAILED DESCRIPTION OF THE INVENTION

Figure 1:
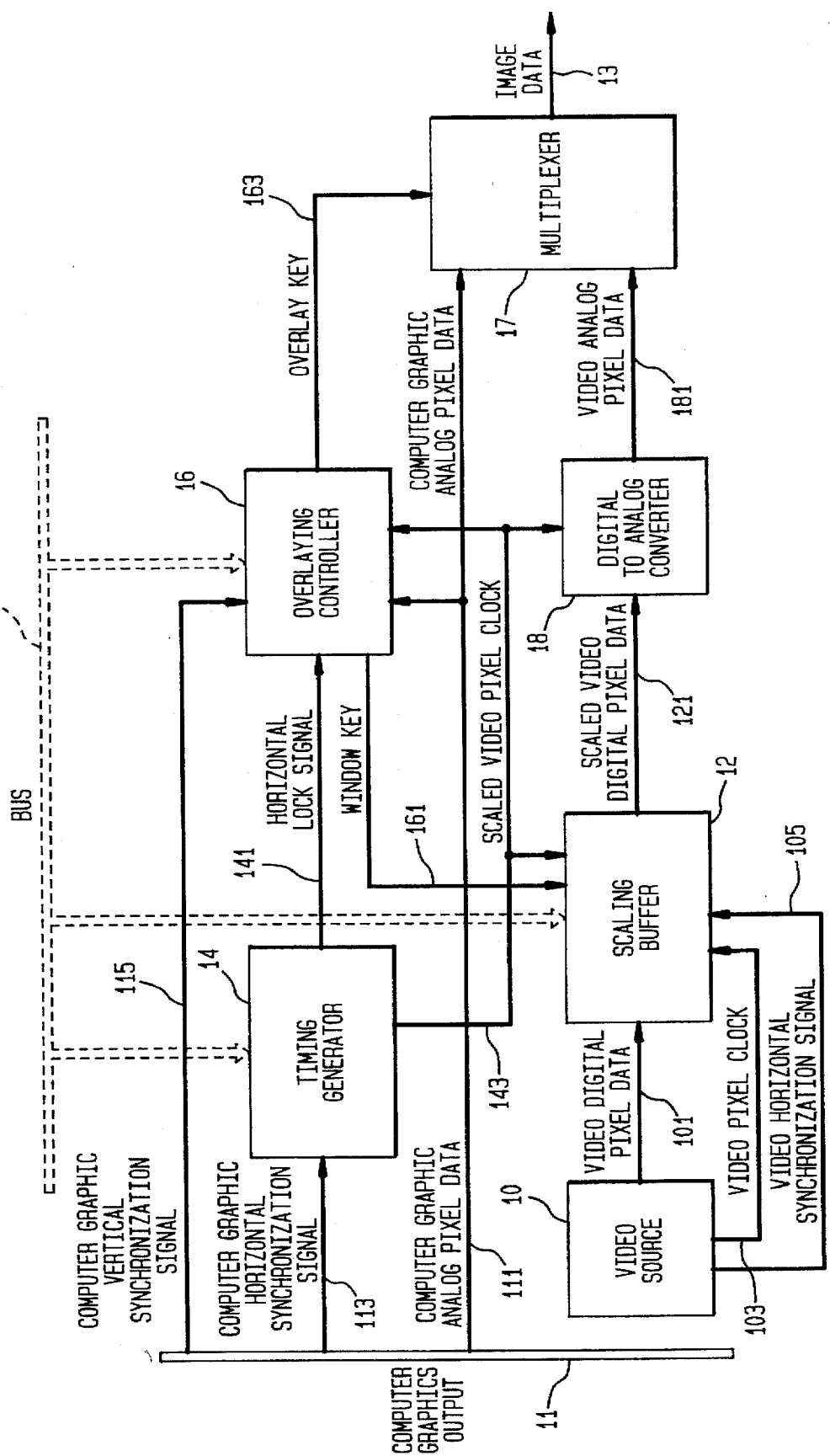
FIG. 1 discloses the functional blocks of the display control apparatus in accordance with the invention.

As shown in FIG. 1, the display control apparatus of the invention receives the analog pixel data 111, vertical synchronization signal 115 and horizontal synchronization signal 113 from the computer graphics output 11 and outputs image data 13 switching between the analog pixel data 111 of the computer graphics and the video analog pixel data 181 of the video output. During the initialization period of the operation, the control data are written into the registers within the apparatus via the controller bus 15 and the operation of the invention depends on the current values within the registers which will be more clear hereinafter. The controller may be any kind of the processor and the controller bus 15 includes data bus, address bus and read, write control signals to access the apparatus.

The apparatus includes a timing generator 14, a scaling buffer 12, a overlay controller 16, a video source 10 and a digital to analog converter 18.

The timing generator 14 is adapted to receive a horizontal synchronization signal 114 of the computer graphics output 11 and generates a pixel clock 143 of scaled video output and a horizontal lock signal 141.

The scaling buffer 12 stores a video digital pixel data 101 therein and has an output port generating the scaled video output 121, responsive to the pixel clock 143 of scaled video output.

The overlay controller 16 is coupled to the controller bus 15 and receives the analog pixel data 111 of the computer graphics output 11 and, responsive to the pixel clock 143 of scaled video output, the horizontal lock signal 141 and the vertical synchronization signal 115 of the computer graphics output 11, overlays the scaled video output 181 onto the computer graphics output 111 by generating the overlay key signal 163.

The video source 10 outputs the video digital pixel data 101 in a well known manner. In accordance with the video pixel clock 103, the video source 10 outputs the pixel data 101 to the scaling buffer 12 and the scaling buffer 12 stores the received data 101 into the two ports memory 20 therein shown in FIG. 2, based on the video pixel clock 103. The digital to analog converter 18 converts the scaled video digital pixel data 121 into the video analog pixel data 181, responsive to the pixel clock of the scaled video 143. The multiplexer 17 performs the switch operation on the input analog pixel data 111 of the computer graphics output and analog pixel data 181 of video output, in response to the overlay signal 163, and outputs the image data 13.

The horizontal synchronization signal 105 from the video source 10 is the first timing point for each horizontal display of the video output 101 and also acts to access initial cell of the memory 20 within the scaling buffer 12. Accordingly, as the horizontal synchronization signal 105 is asserted, the video digital pixel data 101 are stored into the memory 20 starting from the first location of the cells. The window key signal 161 is asserted to reset the output address pointer 24 shown in FIG. 2 to assure the first digital pixel data 121 of the scaled video displayed within the video window comes from the first location of the memory.

To have a more flexible operation of the invention, the controller may program the values of the registers of the scaling buffer 12, overlay controller 16 and timing generator 14 via controller bus 15. The values of the registers control the value of the video scaling factor, the target color regarding the generation of the target key signal, the area of the video window regarding the generation of the window key signal and the parameter of the horizontal pixel number of the scaled video regarding the timing generator 14.

Figure 2:
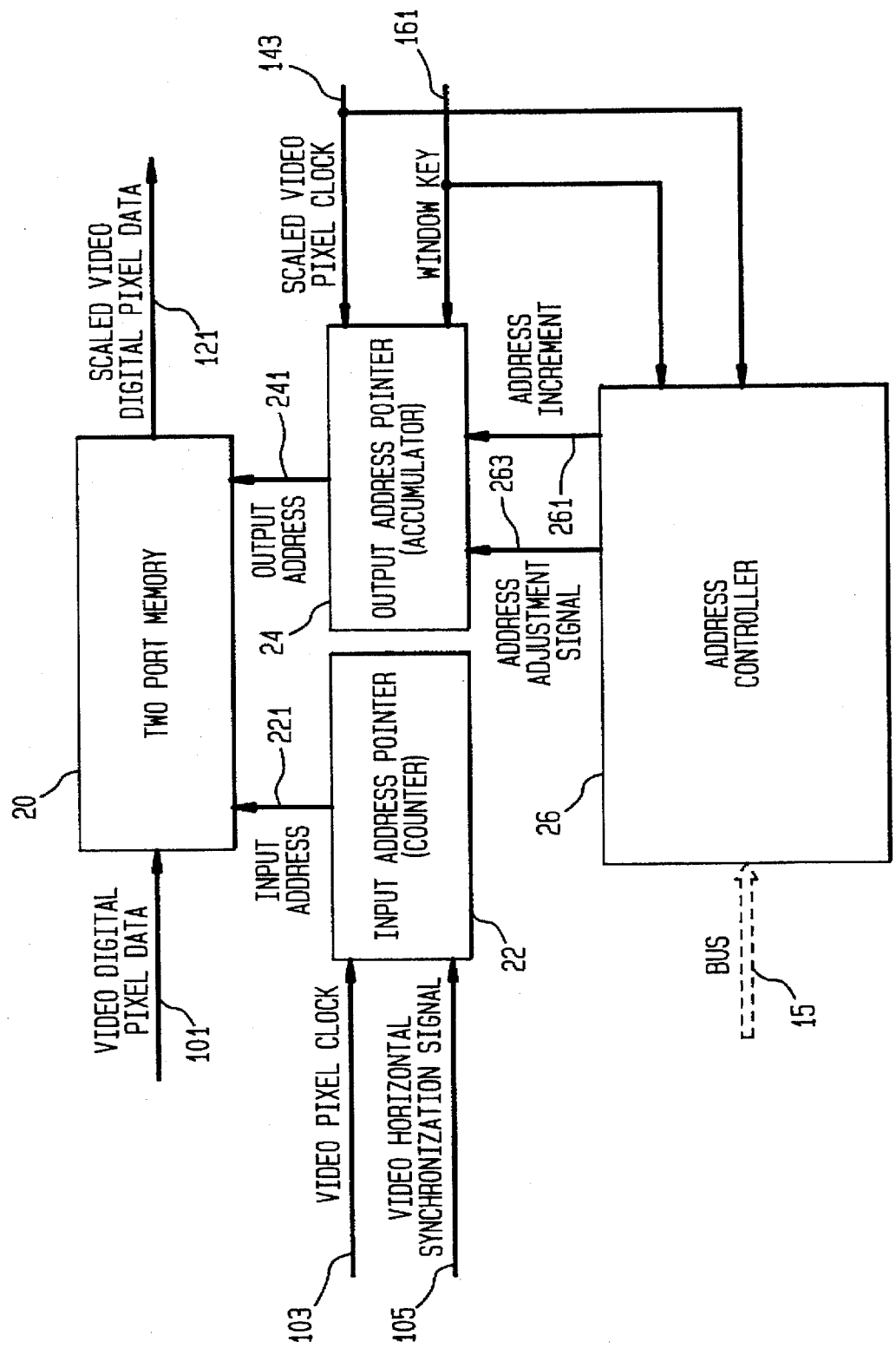
FIG. 2 discloses the functional blocks of the scaling buffer within the invention of FIG. 1.

As shown in FIG. 2, the video scaling apparatus 12 comprises an address controller 26, an output address pointer 24, a two ports memory 20 and an input address pointer 22.

Figure 3:
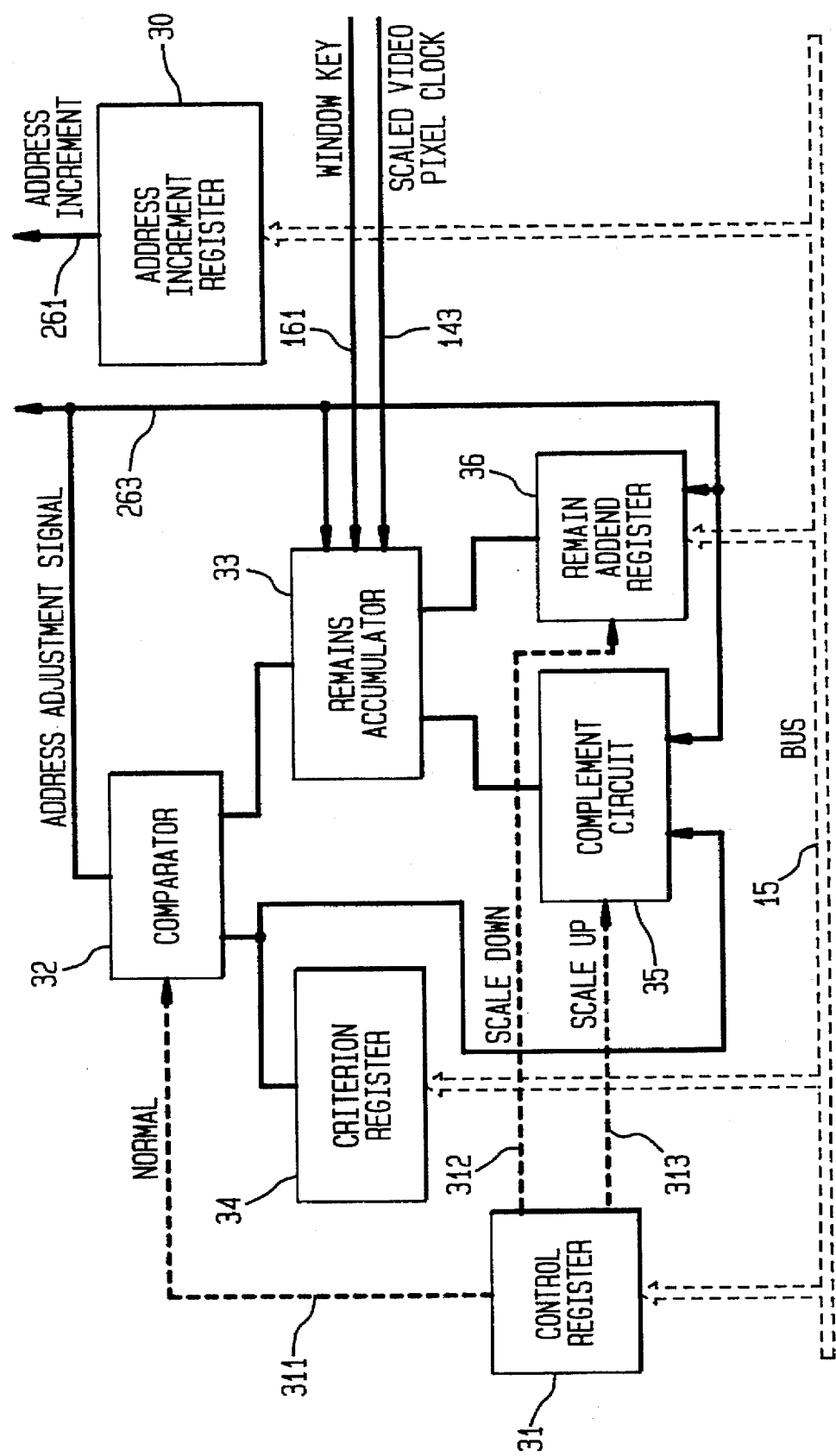
FIG. 3 discloses the functional blocks of the address controller within the invention of FIG. 1.

As shown in FIG. 2 and 3, the address controller 26 is adapted to receive a normal 311, a scale-down 312 and a scale-up 313 signal and generates an address increment signal 261 which has value corresponding to the scale factor value N/D designated.

The output address pointer 24 generates an output address 241, responsive to the address increment signal 261 and the pixel clock 143 of the scaled video, to access the two ports memory 20.

The dual ports memory 20 stores a video digital pixel data 101 therein and has an output port, responsive to the output address 241, generates the scaled video digital pixel data 121 corresponding to the scale factor value N/D. The dual ports memory 20, other than acting as synchronization buffer between the video output 181 and the computer graphics output 111, performs the video scaling operation of the invention. The dual ports memory 20 has an input port, responsive to the input address 221 provided by the input address pointer 22, receives the video digital pixel data 101. In order to place the input data on each adjacent memory location, a counter is used as the input address pointer 22. The video pixel clock 103 increments the value of the address pointer 22 such that the input data are stored in sequence. The video horizontal synchronization signal 105 forces the first pixel of each horizontal scan line to be stored at the first location of respective memory cells. However, an accumulator is used as the output address pointer 24 to fulfill the needs of the scaling operation. Each time a pixel data is output to the scaled video digital pixel data line 121, in response to the pixel clock 143 of scaled video, the value of the address increment signal 261 is accumulated into the output address pointer 24 to access another location of the memory 20. In some events under which adjustment of address accessed is required to offset an accumulation caused by the truncation error of the scaling factor value, the address adjustment signal 263 is enabled to increment the output address pointer 24 by one. The detailed operation of the address adjustment signal 263 will be recited hereinafter.

As shown in FIG. 3, the address controller 26 comprises a control register 31 and address increment register 30, both coupled to the controller bus 15. The control register 31 generates the scale control signals, including the normal signal 311, the scale-down signal 312 and the scale-up signal 313. The address increment register 30 generates the address increment signal 261.

The address controller 26 further comprises a criterion register 34 and a remain addend register 36 both of which are coupled to the controller bus 15. The remain addend register 36 has a first input receiving the scale-down signal 312 and a second input receiving the address adjustment signal 263.

The address controller 26 further comprises a complement circuit 35 having a first input, coupled to an output of the criterion register 34, and a second input, adapted to receive the address adjustment signal 263, and a third input receiving the scale-up signal 313.

The address controller 26 further comprises a remain accumulator 33 and a comparator 32. The remain accumulator 33 has a first input coupled to the output of the complement circuit 35 and a second input coupled to the output of the remain addend register 36. The remain accumulator 33 outputs its value, in response to the address adjustment signal 263, the pixel clock 143 of the scaled video. The comparator 32 compares the output of the criterion register 34 with the output of the remains accumulator 33 to generate the address adjustment signal 263. The comparator 32 has an input receiving the normal signal 311.

The value stored in the address increment register 30 decides the basic increment value of the output address pointer 24. The criterion register 34 stores a reference value with which the remain accumulator 33 compares and by which at what condition the address adjustment signal 263 is to be enabled. The value of the remain addend register 36 is the basic accumulation value to the operation of the remain accumulator 33. The control register 31 generates the normal signal 311, the scale-down signal 312 or the scale-up signal 313 based on the value input from the controller bus 15 and stored therein. The values of all registers shown are programmed by the controller via controller bus 15. The window key signal 161 is used to reset the value of the remains accumulator 33 to zero.

Figure 4:
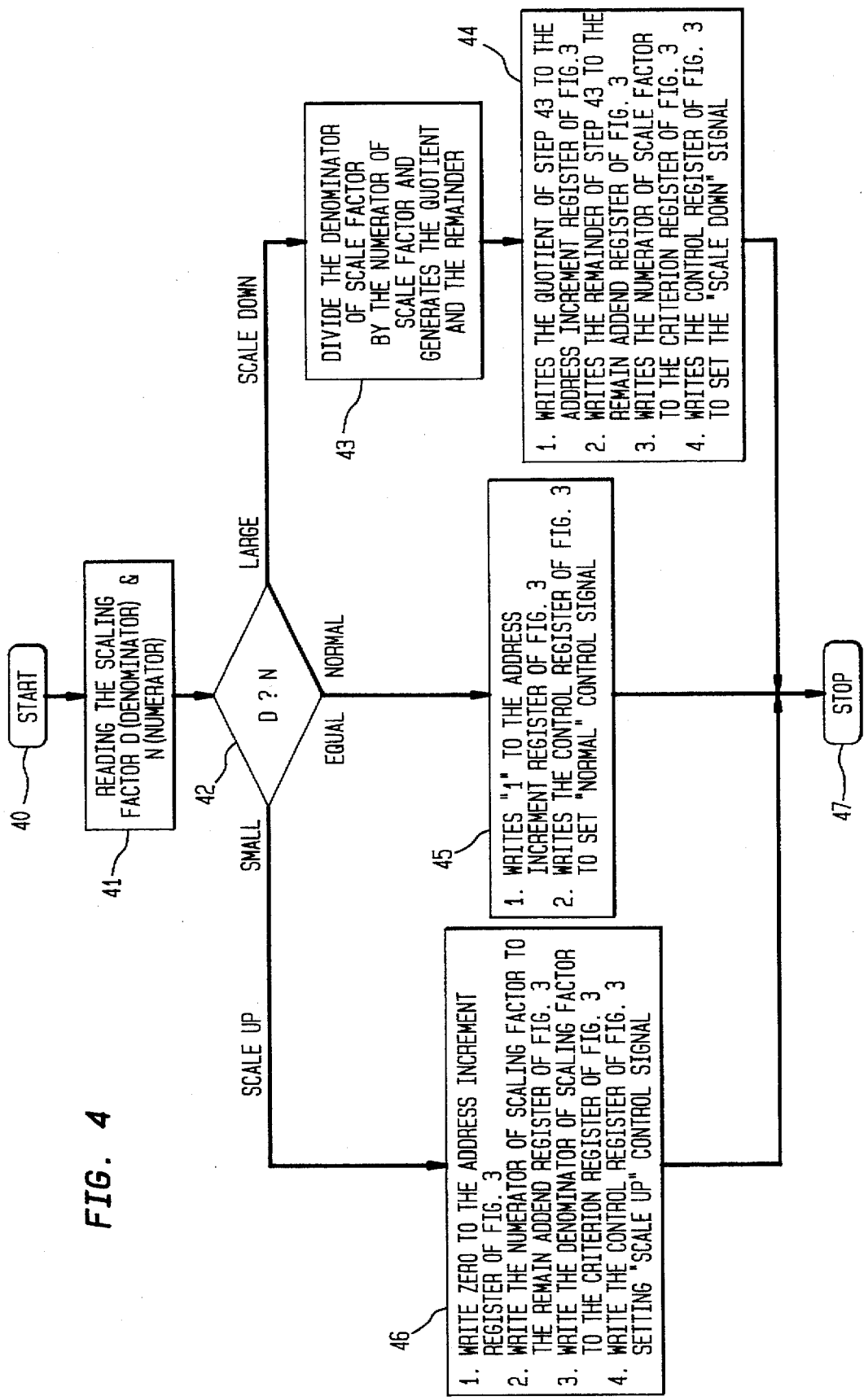
FIG. 4 shows the procedures by which the initial value of the registers shown in address controller of FIG. 3 is set.

As shown in FIG. 4, in step 41 the controller reads the Denominator(D) and the Numerator(N) of the ratio form of the scaling factor. In step 42, which compares the value of the D and N, as the value of scale factor indicates a scale down, the steps 43 and 44 are performed. In step 43, divide the D by N and generates a quotient and remainder of D/N. In step 44, the quotient of D/N is stored into the address increment register 30, the remainder of D/N is stored into the remain addend register 36 and the N is stored into the criterion register 34. Also in step 44, write the control register 31 to set the scale-down signal 312.

As the value of scale factor indicates a scale up in step 42, the step 46 is performed. In step 46, a zero is stored into the address increment register 30, the N is stored into the remain addend register 36, the D is stored into the criterion register 34 and the control register 31 is written to set the scale-up signal 313.

As the value of scale factor indicates a scaling factor being 1 in step 42, then in step 45, 1 is stored into the address increment register 30 and the control register 31 is written to set the normal signal 311.

After the associated operation disclosed in FIG. 4 are completed, the scaling buffer 12 takes over to execute the video image scaling.

Each time the window key signal 161 is asserted, the value within the output address pointer 24 and the remain accumulator 33 is reset to its initial value. Each cycle of the pixel clock 143 of the scaled video updates the values of the output address pointer 24 and the remain accumulator 33 respectively based on the operation of the associated circuits connected thereto.

As normal signal 311 is active, the address adjustment signal 263 is thereby inactive. Accordingly, each time the scaling buffer 12 outputs one pixel data, the output address pointer 24 increments only by one indicating all pixel data are output without video enlargement or reduction effect.

During the video scale down process of the invention, each time the scaling buffer 12 outputs one pixel data, the output address pointer 24 increments by a value of the address increment signal 261, larger than one, output from address increment register 30 and, accordingly, some locations of the memory 20 are skipped during access indicating only the selected pixel data are output with a video reduction effect.

Figure 5:
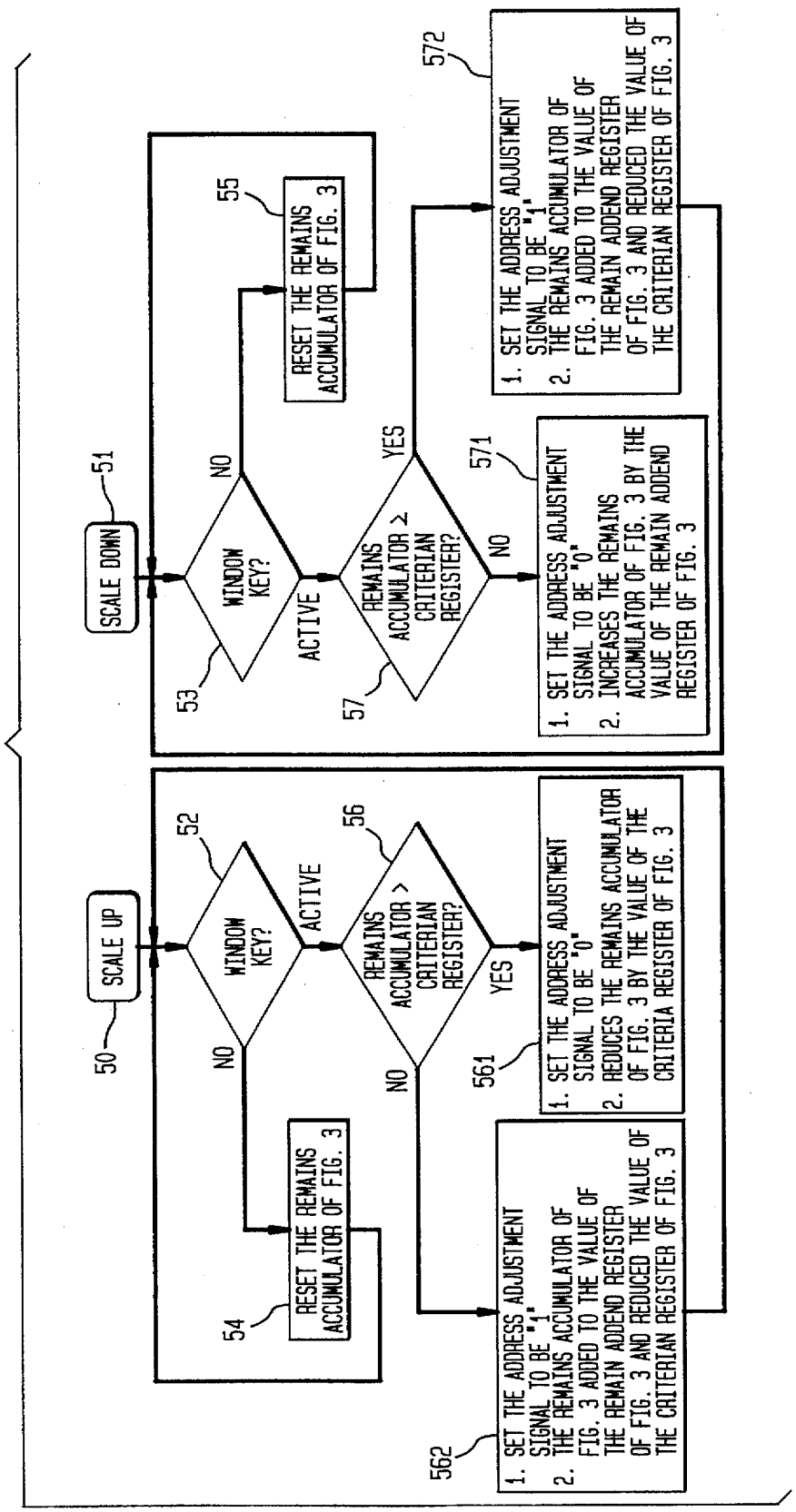
FIG. 5 shows how the values of the registers shown in address controller of FIG. 3 are changed during the video scaling operation of the invention.

Referring to FIG. 5, after the scale-down signal 312 is asserted in step 51, then in step 53, test if the window key signal 161 is asserted. If it is not, in step 55, reset the remain accumulator 33 and afterwards go to step 53.

If the window key signal 161 is asserted indicating a scaled video image is to be displayed, in step 57, check if the remain accumulator 33 is greater than the criterion register 34. If it is no in step 57, then in step 571, set the address adjustment signal 263 to be inactive, or logic 0, and the remains accumulator 33 also accumulates the value from the remain addend register 36, which indicates an truncation error of scaling factor, each time the pixel data is output. Afterwards, go to step 53. At times at which the value of error accumulated in the remain accumulator 33 exceeds the reference value in the criterion register 34 indicated by yes of the step 57, the invention performs the step 572. In step 572, set the address adjustment signal 263 active, or logic 1, and the remain accumulator 33 updates its value by adding its current value to the output of the remain addend register 36 minus the output of the criterion register 34.

During the video scale up process of the invention, each time the scaling buffer 12 outputs one pixel data, the output address pointer 24 increments by a zero output from address increment register 30 and, accordingly, each locations of the memory 20 are repeatedly accessed indicating the pixel data are output with a video enlargement effect. The number of access repetition process depends on the number of times required for the value in the criterion register 34 to reduce to a value smaller than the value in the remain accumulator 33.

Referring to FIG. 5, after the scale up signal 313 is asserted in step 50, then in step 52, test if the window key signal 161 is asserted. If it is not, in step 54, reset the remain accumulator 33 and afterwards go to step 52.

If the window key signal 161 is asserted indicating a scaled video image is to be displayed, in step 56, check if the remain accumulator 33 is greater than the criterion register 34. If it is yes in step 56 indicating same location of the memory 20 has to be accessed again, then in step 561, set the address adjustment signal 263 to be inactive, or logic 0, and reduce the remains accumulator 33 by the value of the criterion register 34. Afterwards, go to step 52. At times at which the value of criterion register 34 exceeds the reference value in the criterion register 34 indicating a next location of memory 20 is to be accessed, the invention performs the step 562. In step 562, set the address adjustment signal 263 active, or logic 1, and the remain accumulator 33 updates its value by adding its residual value of the last access operation to the output of the remain addend register 36 minus the output of the criterion register 34.

With the advantage provided by the address adjustment signal 263, the video scaling process is operated uniformly over the entire video.

Basically, the timing generator 14 refers to the phase of the horizontal synchronization signal 113 of computer graphics output to produce the pixel clock 143 of scaled video and the horizontal lock signal 141 such that, while video being overlaid on the computer graphics, not only the required synchronization but also full screen display of video on any kinds of resolution of the computer graphics are achieved.

Figure 6:
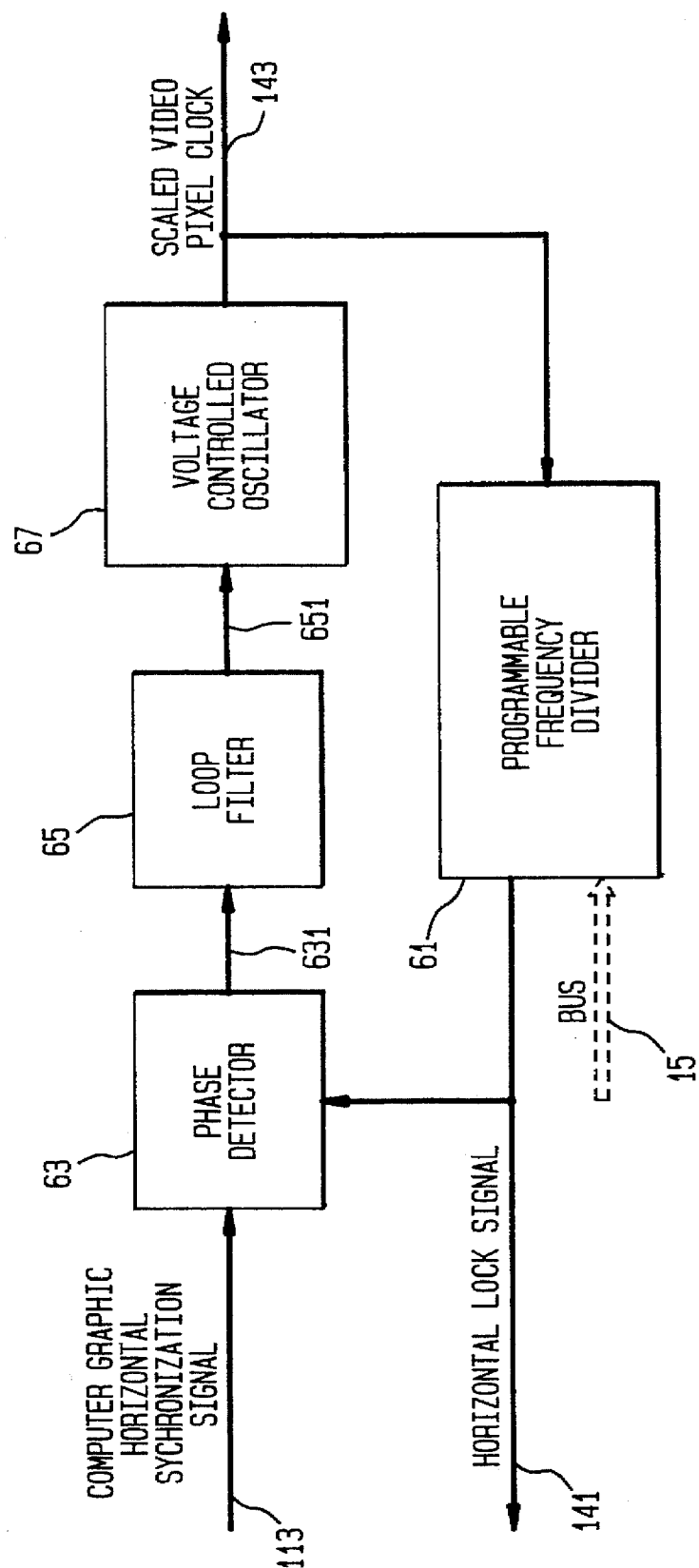
FIG. 6 discloses the functional blocks of the timing generator within the invention of FIG. 1.

As shown in FIG. 6, the timing generator 14 is basically a phase lock loop which generates the pixel clock 143 of the scaled video in synchronization with the horizontal synchronization signal 113 of the computer graphics output. The timing generator 14 comprises a programmable frequency divider 61, a phase detector 63, a loop filter 65 and a voltage controlled oscillator 67.

The programmable frequency divider 61, coupled to the controller bus 15, has an input receiving the pixel clock 143 of the scaled video and an output generating the horizontal lock signal 141. The controller via controller bus 15 programs the pixel number of the horizontal scan line of the video output into the programmable frequency divider 61. This pixel number is used by the frequency divider as its divisor to generate the horizontal lock signal 141 based on the frequency of the pixel clock 143 of the scaled video. The horizontal lock signal 141 is used as a horizontal synchronization signal for video output operation.

The phase detector 63 generates a control signal 631 by comparing phase difference between the horizontal synchronization signal 113 and the horizontal lock signal 141.

The loop filter 65 generates a filtered control signal 651 by filtering out a noise within the control signal 631.

The voltage controlled oscillator 67 generates the pixel clock 143 of the scaled video, in response to the filtered control signal 651. The oscillation frequency of the pixel clock 143 varies according to the voltage of the control signal 651. The pixel clock 143 of the scaled video signal is also input to the frequency divider 61 to generate the horizontal lock signal 141.

Since the operation of the phase lock loop, any phase difference between the horizontal lock signal 141 and horizontal synchronization signal 113 will diminish in the loop operation, and a final synchronization is achieved.

The pixel clock 143 and the horizontal lock signal 141 are provided to the scaling buffer 12, digital to analog converter 18, programmable image overlay controller 16 as the pixel clock and the horizontal synchronization signal respectively.

Figure 7:
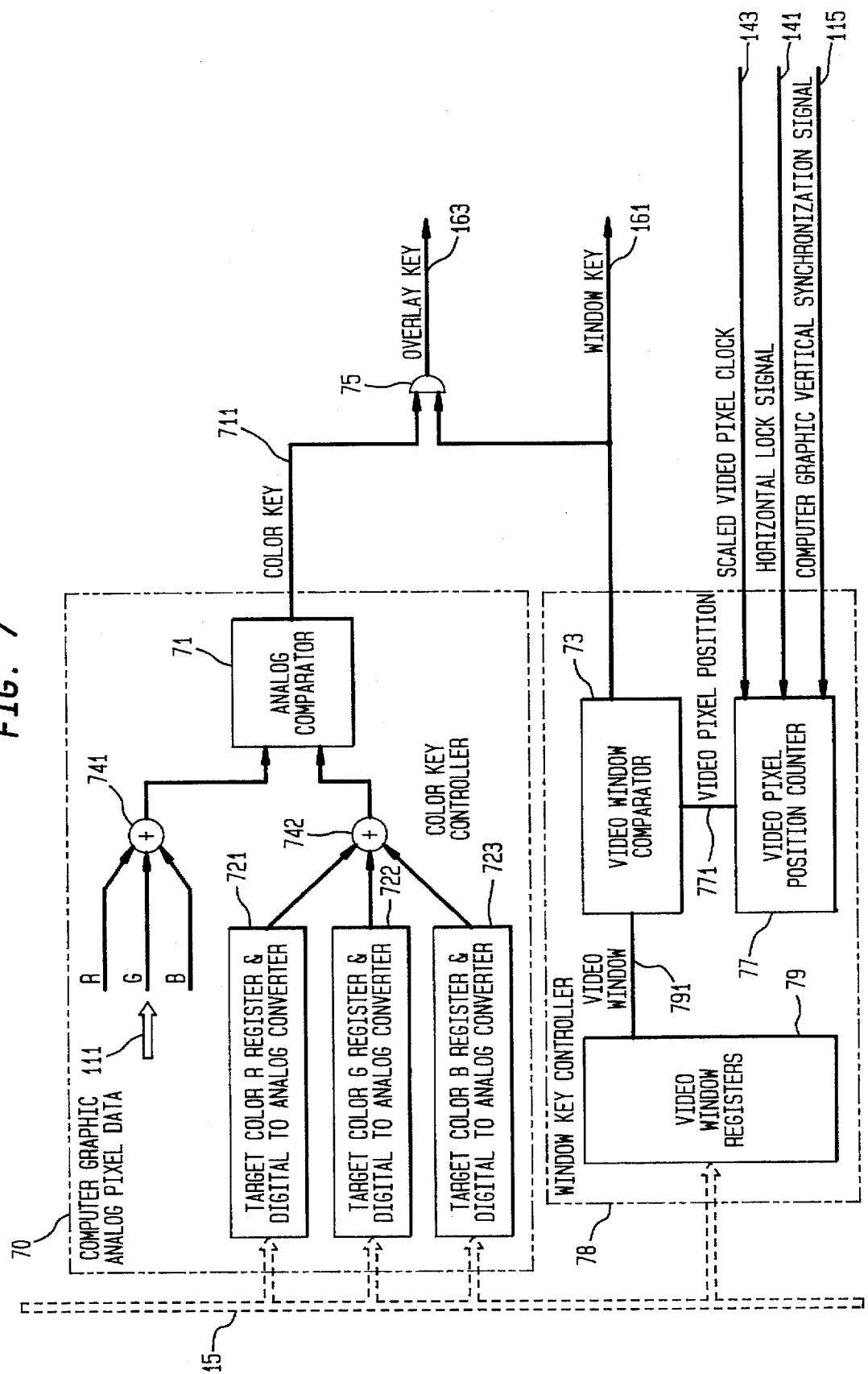
FIG. 7 discloses the functional blocks of the overlay controller within the invention of FIG. 1.

As shown in FIG. 7, the image overlay controller 16, coupled to the controller bus 15 and receiving the analog pixel data 111 of the computer graphics output and, responsive to the pixel clock 143 of the video output, the horizontal lock signal 141, and the vertical synchronization signal 115 of the computer graphics output, generates the overlay key signal 163.

The image overlay controller 16 comprises a first controller 70 and a second controller 78 and an AND gate 75. The first controller 70 generates a color key signal 711. The second controller 78 generates the window key signal 161.

The AND gate 75 is adapted to receive the color key signal 711 and the window key signal 161, and generates the overlay key signal 163.

The first controller 70 comprises an analog comparator 71 comparing the analog pixel data 111, which includes R, G, B components, of the computer graphics output with a target color, output from the corresponding Digital to Analog converter 721, 722 and 723, to generate the color key signal 711. Also included in the Digital to Analog converter 721, 722 and 723 are the corresponding register storing the target color input from the controller via the controller bus 15.

The second controller 78 comprises a video window comparator 73 comparing the location of the video analog pixel data 771 with a predetermined video window 791 to generate the window key signal 161.

The second controller 78 further comprises a position counter 77 receiving the pixel clock 143 of the scaled video, the horizontal lock signal 141 and the vertical synchronization signal 115 of the computer graphics, to generates the video pixel location 771.

The controller programs the R, G, B component value of the registers within the D/A converter 721, 722, 723 to select the target color controlling the color key signal 711 and programs the video window register 79 to predetermine the area of the displayed video window via the controller bus 15. One analog comparator is required for comparison of each color component of the target color with the analog pixel data 111. Therefore, total of three analog comparators are required other than the complications of the associated circuits. However, in the shown preferred embodiment, in order to simplify the design of the color key controller 70, the three components of target color within the D/A converters 721, 722, 723 and the three components of analog pixel data. 111 of the computer graphics output are added first at the corresponding analog adder 741 and 742 respectively before comparison. To cope with this simplification design, the target color must be one having R, G, B components all being logic 1, or must be another one having R, G, B components all being logic 0. It is known it is black when R, G, B components all are logic 0 and it is white when R, G, B components all are logic 1.

If two outputs from the analog adder 741 and 742 matches at the analog comparator 71, the color key signal 711 is enabled. Otherwise, the color key signal 711 is disabled.

The controller transforms the upper-left corner coordinates, the height and the width of the video window into the locations of the video pixels corresponding to the four corners of the video window. In the video window register 79, there are four registers used to save the four corner locations of the video window prescribed. In the position counter 77, one horizontal counter is triggered by the horizontal lock signal 141 and another vertical counter is triggered by the vertical synchronization signal 115 of the computer graphics output. Counting the pixel clock 143 of the scaled video has the idea of the horizontal location of the present pixel data. Counting the horizontal lock signal 141 has the idea of the vertical location of the present pixel data. The output of these two counters form the video pixel position signal 771. When the video pixel position signal 771 falls within the region defined in registers 79, the window key signal 161 is enabled. Otherwise, it is disabled. The enabled window key signal 161 not only affects the output of the AND gate 75 but also controls the operation of the scaling buffer 12.

The AND gate 75 activates the overlay key signal 163 only when both the color key signal 711 and window key signal 161 are both active. The arrangement avoids the disadvantages of the implementation of the single color key approach or single window key approach.

We claim:

1. A video scaling apparatus, storing video digital pixel data, for outputting scaled video data which has a scale factor value of N/D with respect to the video digital pixel data, comprising:

control means responsive to a scale control signal, for generating an address increment signal which corresponds to the scale factor value of N/D, the scale control signal being one of a normal signal, a scale-down signal, and a scale-up signal:

output address pointer means, responsive to the address increment signal, an address adjustment signal and a pixel clock of the scaled video data, for generating an output address, the address adjustment signal is enabled each time an accumulated truncation error caused by the scale factor value of N/D is greater than a criterion value; and a dual port memory, storing the video digital pixel data and, responsive to the output address, for generating the scaled video data; and wherein the control means comprises:

a control register, coupled to a controller bus, for selectively generating the scale control signal, an address increment register, coupled to the controller bus, for generating the address increment signal;

a criterion register, coupled to the controller bus, for storing the criterion value; and a remain addend register coupled to the controller bus, the remain addend register has a first input receiving the scale-down signal and a second input receiving the address adjustment signal.

2. The apparatus as recited in claim 1, as the value of scale factor indicates a scale down, wherein, a quotient of D/N is stored into the address increment register, a remainder of D/N is stored into the remain addend register, the N is stored into the criterion register.

3. The apparatus as recited in claim 1, wherein the control means further comprises:

a complement circuit having a first input, coupled to an output of the criterion register, and a second input, adapted to receive the address adjustment signal, and a third input receiving the scale-up signal;

a remain accumulator, the remain accumulator has a first input coupled to an output of the complement circuit and a second input coupled to an output of the remain addend register, the remain accumulator, in response to the address adjustment signal and the pixel clock of the scaled video, outputs its value;

a comparator, the comparator compares the criterion value of the criterion register with the value of the remains accumulator for generating the address adjustment signal, the comparator has an input receiving the normal signal.

4. The apparatus as recited in claim 1, further comprising a timing generator, responsive to a horizontal synchronization signal of a computer graphics output and a pixel number of horizontal scan line of the scaled video data, for generating the pixel clock of the scaled video data.

5. The apparatus as recited in claim 3, wherein the apparatus is configured so that as the value of the scale factor indicates a scale up, a zero is stored into the address increment register, the N is stored into the remain addend register, the D is stored into the criterion register.

6. A display control apparatus, storing video digital pixel data, for generating a video output having a scale factor value of N/D with respect to the video digital pixel data, comprising:

a timing generator, adapted to receive a horizontal synchronization signal of a computer graphics output and a pixel number of horizontal scan line of the video output, for generating a pixel clock of the video output;

a frame buffer for storing the video digital pixel data, responsive to the pixel clock of the video output, for generating the video output in synchronization with the computer graphics output, wherein the timing generator is a phase lock loop which generates the pixel clock of the video output, the timing generator comprises:

a programmable frequency divider, coupled to a controller bus for receiving the pixel number, having an input receiving the pixel clock of the video output and an output generating a horizontal lock signal;

a phase detector for generating a control signal by comparing phase difference between the horizontal synchronization signal and the horizontal lock signal;

a loop filter for generating a filtered control signal by filtering out a noise within the control signal; and a voltage controlled oscillator, in response to the filtered control signal, for generating the pixel clock of video output.

7. The display control apparatus as recited in claim 6, wherein the frame buffer comprises:

control means, responsive to a scale control signal, for generating an address increment signal which corresponds to the scale factor value of N/D, the scale control signal being one of a normal signal, a scale-down signal and a scale-up signal;

output address pointer means, responsive to the address increment signal and the pixel clock of the output, for generating an output address; and a dual port memory, storing the video digital pixel data and, responsive to the output address, for generating the video output which corresponds to the scale factor value of N/D.

8. The apparatus as recited in claim 7, wherein the generation of the output address is further responsive to an address adjustment signal which is enabled each time an accumulated truncation error caused by the scale factor value is greater than a criterion value.

9. The apparatus as recited in claim 8, wherein the control means comprises:

a control register, coupled to a controller bus for receiving the scale control signal, for generating a normal, a scale-down or a scale-up signal, an address increment register, coupled to the controller bus, for generating the address increment signal;

a criterion register, coupled to the controller bus, for storing the criterion value;

a remain addend register coupled to the controller bus, the remain addend register has a first input receiving the scale-down signal and a second input receiving the address adjustment signal.

10. The apparatus as recited in claim 9, as the value of scale factor indicates a scale down, wherein, a quotient of D/N is stored into the address increment register, a remainder of D/N is stored into the remain addend register, the N is stored into the criterion register.

11. The apparatus as recited in claim 9, wherein the control means further comprises:

a complement circuit having a first input, coupled to an output of the criterion register, and a second input, adapted to receive the address adjustment signal, and a third input receiving the scale-up signal;

a remain accumulator, the remain accumulator has a first input coupled to an output of the complement circuit and a second input coupled to an output of the remain addend register, the remain accumulator, in response to the address adjustment signal and the pixel clock of the scaled video, outputs its value; and a comparator, the comparator compares the criterion value of the criterion register with the value of the remains accumulator for generating the address adjustment signal, the comparator has an input receiving the normal signal.

12. The apparatus as recited in claim 11, wherein the apparatus is configured so that as the value of the scale factor indicates a scale up, a zero is stored into the address increment register, the N is stored into the remain addend register, the D is stored into the criterion register.

13. A display control apparatus for overlaying a video output onto a computer graphics output, comprising:

image overlay control means, coupled to a controller bus and receiving a first analog pixel data of the computer graphics output and, responsive to a pixel clock of the video output, a horizontal lock signal, and a vertical synchronization signal of the computer graphics output, for generating an overlay key signal; and a multiplexer, adapted to receive the first analog pixel data of the computer graphics output and a second analog pixel data of the video output, and, responsive to the overlay key signal, for outputting the first and second analog pixel data selectively, wherein the image overlay control means comprises:

a first control means for generating a color key signal;

a second control means for generating a window key signal; and an AND gate, adapted to receive the color key signal and the window key signal, for generating the overlay key signal.

14. The display control apparatus as recited in claim 13, wherein the first control means comprises:

an analog comparator comparing the first analog pixel data of the computer graphics output with a target color to generate the color key signal.

15. The display control apparatus as recited in claim 13, wherein the second control means comprises:

a video window comparator comparing a location of the second analog pixel data with a predetermined video window to generate the window key.

16. The display control apparatus as recited in claim 15, wherein the second control means further comprises:

a position counter receiving the pixel clock of the video output, the horizontal lock signal and the vertical synchronization signal of the computer graphics, for generating the location of the second analog pixel data.

17. The apparatus as recited in claim 13, further comprising a timing generator, responsive to a horizontal synchronization signal of a computer graphics output and a pixel number of horizontal scan line of the video output, for generating the pixel clock of the video output.

18. The display control apparatus as recited in claim 17, wherein the timing generator is a phase lock loop which generates the pixel clock of the video output, the timing generator comprises:

a programmable frequency divider, coupled to a controller bus for receiving the pixel number, having an input receiving the pixel clock of the video output and an output generating a horizontal lock signal;

a phase detector for generating a control signal by comparing phase difference between the horizontal synchronization signal and the horizontal lock signal;

a loop filter for generating a filtered control signal by filtering out a noise within the control signal;

a voltage controlled oscillator for generating the pixel clock of the video output, in response to the filtered control signal.

19. A display control apparatus storing video digital pixel data, for generating scaled video data which has a scale factor value of N/D with respect to the video digital pixel data, comprising:

control means, responsive to a scale control signal, for generating an address increment signal which corresponds to the scale factor value of N/D, the scale control signal being one of a normal signal, a scale-down signal and a scale-up signal;

output address pointer means, responsive to the address increment signal, an address adjustment signal and a pixel clock of the scaled video data, for generating an output address, the address adjustment signal is enabled each time an accumulated truncation error, caused by the scale factor value of N/D, is greater than a criterion value;

a dual port memory, storing the video digital pixel data and, responsive to the output address, for generating the scaled video data; and a digital to analog converter for converting the scaled video data into video analog pixel data, wherein the control means comprises:

a control register, coupled to a controller bus, for selectively generating the scale control signal;

an address increment register, coupled to the controller bus, for generating the address increment signal;

a criterion register, coupled to the controller bus, for storing the criterion value; and a remain addend register coupled to the controller bus, the remain addend register has a first input receiving the scale-down signal and a second input receiving the address adjustment signal.

20. The apparatus as recited in claim 19, as the value of scale factor indicates a scale down, wherein, a quotient of D/N is stored into the address increment register, a remainder of D/N is stored into the remain addend register, the N is stored into the criterion register.

21. The apparatus as recited in claim 19, wherein the control means further comprises:

a complement circuit having a first input, coupled to an output of the criterion register, and a second input, adapted to receive the address adjustment signal, and a third input receiving the scale-up signal;

a remain accumulator, the remain accumulator has a first input coupled to an output of the complement circuit and a second input coupled to an output of the remain addend register, the remain accumulator, in response to the address adjustment signal and the pixel clock of the scaled video, outputs its value; and a comparator, the comparator compares the criterion value of the criterion register with the value of the remains accumulator for generating the address adjustment signal, the comparator has an input receiving the normal signal.

22. The apparatus as recited in claim 21, wherein the apparatus is configured so that as the value of the scale factor indicates a scale up, a zero is stored into the address increment register, the N is stored into the remain addend register, the D is stored into the criterion register.

23. The apparatus as recited in claim 19, further comprising a timing generator, responsive to a horizontal synchronization signal of a computer graphics output and a pixel number of horizontal scan line of the scaled video data, for generating the pixel clock of the scaled video data.

24. A display control apparatus, storing video digital pixel data, for generating a scaled video output which has a scale factor value of N/D with respect to the video digital pixel data, overlaid onto a computer graphics output comprising:

a timing generator, adapted to receive a horizontal synchronization signal of the computer graphics output and a pixel number of horizontal scan line of the scaled video output, for generating a pixel clock of the scaled video output and a horizontal lock signal;

a scaling buffer, responsive to the pixel clock of the scaled video output, for generating the scaled video output; and an overlay control means, coupled to a controller bus, receiving analog pixel data of the computer graphics output and responsive to the pixel clock of the scaled video output, the horizontal lock signal and a vertical synchronization signal of the computer graphics output, for overlaying the scaled video output onto the computer graphics output, wherein the timing generator comprises:

a programmable frequency divider, coupled to the controller bus for receiving the pixel number, having an input receiving the pixel clock of the scaled video output and an output generating the horizontal lock signal;

a phase detector for generating a control signal by comparing phase difference between the horizontal synchronization signal and the horizontal lock signal;

a loop filter for generating a altered control signal by filtering out a noise within the control signal; and a voltage controlled oscillator for generating the pixel clock of the scaled video output, in response to the filtered control signal.

25. The display control apparatus as recited in claim 24, wherein the overlay control means comprises:

first control means having an analog comparator for generating a color key signal by comparing the analog pixel data of the computer graphics output with a target color;

second control means having a video window comparator and a position counter, the video window comparator generates a window key signal by comparing a location of the analog pixel data of the scaled video output with a predetermined window area, the position counter, responsive to the pixel clock of the scaled video output, the horizontal lock signal and the vertical synchronization signal of the computer graphics output, generates the location of the analog pixel data of the scaled video output; and an AND gate, adapted to receive the color key signal and the window key signal, for generating an overlay key signal to overlay the scaled video output onto the computer graphics output.

26. The display control apparatus as recited in claim 24, wherein the scaling buffer comprises:

a control means, responsive to a scale control signal, for generating an address increment signal which corresponds to the scale factor value of N/D, the scale control signal being one of a normal signal, a scale-down signal and scale-up signal;

an output address pointer means, responsive to the address increment signal and the pixel clock of the scaled video output, for generating an output address; and a dual port memory, storing the video digital pixel data and responsive to the output address for generating the scaled video output which corresponds to the scale factor value of N/D.

* * * * *